(12) United States Patent
Yamashita (10) Patent No.: US 9,785,224 B2
(45) Date of Patent: Oct. 10, 2017

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Takahiro Yamashita, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 14/800,202

(22) Filed: Jul. 15, 2015

(65) Prior Publication Data

US 2016/0026232 A1    Jan. 28, 2016

(30) Foreign Application Priority Data

Jul. 22, 2014   (JP) ................................ 2014-148831

(51) Int. Cl.
| | | |
|---|---|---|
| *G06F 1/00* | (2006.01) | |
| *G06F 1/32* | (2006.01) | |
| *G03G 15/00* | (2006.01) | |
| *G06F 9/44* | (2006.01) | |

(52) U.S. Cl.
CPC ....... *G06F 1/3287* (2013.01); *G03G 15/5004* (2013.01); *G06F 1/3206* (2013.01); *G06F 1/3218* (2013.01); *G06F 1/3265* (2013.01); *G06F 1/3284* (2013.01); *G06F 9/4418* (2013.01); *Y02B 60/1242* (2013.01); *Y02B 60/1267* (2013.01); *Y02B 60/1282* (2013.01); *Y02B 60/186* (2013.01); *Y02B 60/32* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 8,711,394 B2* | 4/2014 | Furutani | ................. | H04N 1/00 323/318 |
| 2006/0152084 A1* | 7/2006 | Tupman | ............... | H02J 7/0054 307/64 |
| 2009/0217065 A1* | 8/2009 | Araujo, Jr. | .................... | 713/320 |
| 2014/0058679 A1* | 2/2014 | Varoglu | ............ | H04M 1/72569 702/19 |

FOREIGN PATENT DOCUMENTS

| | | | | |
|---|---|---|---|---|
| JP | 2006-74747 A | | 3/2006 | |
| JP | 2006074747 A | * | 3/2006 | ............... H04N 1/00 |

* cited by examiner

*Primary Examiner* — Mohammed Rehman
(74) *Attorney, Agent, or Firm* — Fitzpatrick, Cella, Harper & Scinto (57) ABSTRACT

An information processing apparatus according to the present embodiment is capable of transiting to a power saving state and retains a status of a resume requesting device before the information processing apparatus transits to the power saving state. When resuming from the power saving state, the information processing apparatus acquires a status of the resume requesting device. The information processing apparatus further determines a device to which power is supplied based on a result of comparison between the status of the resume requesting device retained and the status of the resume requesting device acquired.

20 Claims, 10 Drawing Sheets

FIG.1

| TYPE OF RESUME REQUESTING DEVICE | CATEGORY | STATUS A | STATUS B |
|---|---|---|---|
| POWER CONTROL UNIT | 2 | STANDBY | RESUME REGISTER SET |
| NIC | 2 | STANDBY | DATA RECEIVED |
| MODEM | 2 | STANDBY | DATA RECEIVED |
| TIMER | 2 | BEFORE PREDETERMINED TIME ELAPSES | PREDETERMINED TIME ELAPSED |
| USB HOST CONTROLLER | 1 | STANDBY | DATA RECEIVED |
| OPERATION UNIT I/F | 1 | NO KEY PRESSED | KEY PRESSED |
| PROXIMITY SENSOR | 1 | NO OBJECT IN PROXIMITY | OBJECT IN PROXIMITY |
| DOCUMENT READING UNIT | 1 | NO DOCUMENT | DOCUMENT DETECTED |
| OPEN/CLOSE SENSOR | 1 | CLOSED | OPEN |

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for an information processing apparatus, and a storage medium and, more particularly to an information processing apparatus having a suspend feature which places the information processing apparatus not being used into a power saving state, a control method for an information processing apparatus, and a storage medium.

Description of the Related Art

Today, some information processing apparatuses have a suspend feature which places a system into a power saving state to reduce power consumption. Further, some information processing apparatuses having the suspend feature have a resume feature which switches the system from the power saving state to a normal power state. In a suspend mode, if the system detects a resume request from a user, the information processing apparatus having the resume feature can cause the system to return to the state immediately before entering the suspend mode.

Examples of the resume request from the suspend mode include acceptance of a key operation on an operation panel, a timer interrupt, reception of a network packet by a network interface card (NIC), and detection of placement of a document on a reading unit of an image forming apparatus. Once the resume request is received, the system starts resume processing, and resets system hardware and loads software through the resume processing. After the resume processing by the system is completed, the reset hardware and loaded software cause the system to return to an operable state. Generally, it takes about several seconds for the system to complete the resume processing. The functions of the system are limited during that time.

Japanese Patent Laid-Open No. 2006-074747 discloses a data processing apparatus configured to, when any resume request is detected in a system in a power saving state, store in a storage unit a factor of the resume request and then resume energization of the system. The technique disclosed in Japanese Patent Laid-Open No. 2006-074747 allows the data processing apparatus, after the system returns to a normal power state, to perform resume processing according to the type of resume request stored in the storage unit.

For example, in a case where there a resume request indicating that a NIC (network interface card) has received a network packet via a local area network (LAN), a user is not always in the vicinity of the data processing apparatus. Accordingly, the data processing apparatus can perform resume processing in a mode of not resuming power supply to an operation panel. On the other hand, in a case where there is a resume request indicating that a key operation on the operation panel has been accepted, it is assumed that the user is in the vicinity of the data processing apparatus. Accordingly, the data processing apparatus can perform resume processing in a mode of immediately resuming power supply to the operation panel.

SUMMARY OF THE INVENTION

In response to receive a resume request, the system generates an interrupt to a CPU, and the resume processing by the CPU is started. However, if the system receives another resume request before the resume processing is completed, the latter resume request may be lost. Accordingly, there is a problem that after the system receives a resume request and resume processing is started, if a resume request caused by another factor is received by the time the resume processing is completed, the resume processing cannot be performed in response to the last-received resume request.

An information processing apparatus of the present invention is an information processing apparatus capable of transiting to a power saving state, the apparatus comprising: a retaining unit configured to retain a status of a resume requesting device that causes the information processing apparatus to resume from the power saving state, the status of the resume requesting device being a status before the information processing apparatus transits to the power saving state; a detection unit configured to detect a factor for the information processing apparatus to resume from the power saving state; a resume unit configured to cause the information processing apparatus to resume from the power saving state in a case where the detection unit detects the factor; an acquisition unit configured to acquire a status of the resume requesting device when the resume unit causes the information processing apparatus to resume from the power saving state; and a determination unit configured to determine a device to which power is supplied based on a result of comparison between the status of the resume requesting device retained by the retaining unit and the status of the resume requesting device acquired by the acquisition unit.

Further features of the present invention will become apparent from the following description of exemplary embodiments (with reference to the attached drawings).

DESCRIPTION OF THE EMBODIMENTS

Modes for carrying out the present invention will now be described with reference to the attached drawings. It should be noted that components described in the embodiment are only exemplary and are not intended to limit the scope of the invention.

Figure 1:
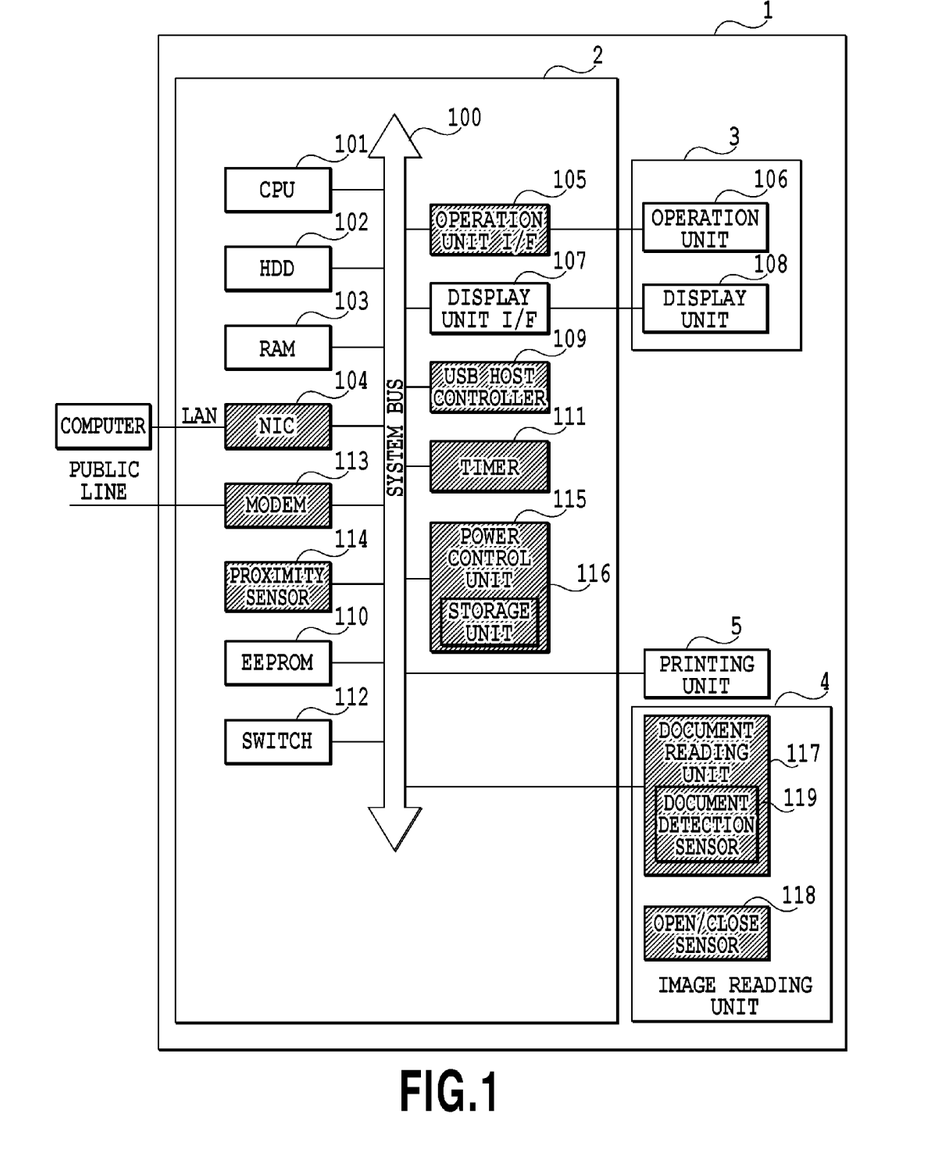
FIG. 1 is a block diagram showing an image forming apparatus according to one embodiment.

FIG. 1 is a block diagram showing the configuration of an image forming apparatus 1 which is an exemplary information processing apparatus according to the present embodiment. In the present embodiment, the image forming apparatus 1 may be a multi-function printer having a printer function, a scanner function, a facsimile function, a storage function, and the like.

In FIG. 1, a controller 2 of the image forming apparatus 1 includes a CPU 101, which has control over the devices connected to a system bus 100 in response to a given instruction set and an input.

A hard disk drive (HDD) 102 is a non-volatile memory unit and stores therein various programs for providing instructions to the CPU 101. The HDD 102 further stores therein an OS serving as basic software on a system, a boot loader for selecting an OS, firmware for controlling hardware such as devices, and data such as a file system for efficiently managing files.

A RAM 103 is a volatile memory and is used as a main memory, a work area, or the like for the CPU 101. The various programs stored in the HDD 102 are loaded into the RAM 103. The loaded content of the processing is interpreted by the CPU 101, whereby the various programs are executed.

A NIC (network interface card) 104 transmits and receives data that is transmitted from an external device such as a file server via a network such as a LAN.

An operation panel 3 includes an operation unit 106 for accepting instruction inputs from a user and a display unit 108 for displaying system information. The operation unit 106 may be, for example, a keyboard, a touchscreen display, or the like. The display unit 108 may be a liquid crystal display or the like. It should be noted that the operation unit 106 and the display unit 108 may be formed integrally by using the touchscreen display.

An operation unit I/F ("I/F" stands for "interface") 105 detects or controls instruction inputs from the operation unit 106. A display unit I/F 107 controls display on the display unit.

A USB host controller 109 is an interface that allows a mass storage device or a device having a USB interface such as an IC card reader to be connected to the controller 2.

An EEPROM 110 is a rewritable small-capacity non-volatile memory unit and stores therein setting information on the image forming apparatus 1.

A timer 111 has a secondary battery and constantly measures an elapsed time from a reference time while measuring an elapsed time in response to an instruction from the CPU 101. A switch 112 can generate a power control instruction for the CPU 101.

A modem 113 communicates with an external device connected via a public line and receives/transmits facsimile data transmitted from the external device via the public line.

A proximity sensor 114 can detect whether a user is in the proximity of the image forming apparatus 1.

A power control unit 115 performs power control of the image forming apparatus 1.

The power control unit 115 has a storage unit 116 for storing therein resume factor information which will be described later.

An image reading unit 4 has a document reading unit 117 including a document feeder, a scanner, a manual feed tray, and the like, and can read a document placed on the document reading unit 117 by the user and convert the document into electronic data.

If the document reading unit 117 has an open/close mechanism to place a document, an open/close sensor 118 detects an open/close operation on the open/close mechanism, and the CPU 101 can be notified of an open/closed state in response to the detection. Furthermore, the document reading unit 117 has a document detection sensor 119. Upon detection of placement of a document by the document detection sensor 119, interrupt processing occurs in the CPU 101 so as to perform the processing at the time of placement and detect the size of the document.

In the hardware blocks of the image forming apparatus 1 shown in FIG. 1, shaded hardware blocks represent resume requesting devices capable of generating a resume request in the power saving state. Each resume requesting device generates an interrupt if predetermined conditions are satisfied, and notifies the power control unit 115 of the interrupt. Examples of cases where a resume requesting device generates an interrupt include the case where a document is placed on the document reading unit 117, the case where the proximity sensor 114 detects an object in proximity within a specified distance, and the case where the NIC 104 receives data such as a network packet.

If an interrupt is received during the power saving state, the power control unit 115 stores in the storage unit 116 of the power control unit 115 resume factor information indicating the type of device generating a resume request.

After the image forming apparatus 1 transits from the power saving state to the normal power state, the CPU 101 can determine the type of the device generating the resume request based on the resume factor information stored in the storage unit 116 of the power control unit 115. Furthermore, with reference to a register included in each resume requesting device, the CPU 101 can detect the status of the resume requesting device.

The CPU 101 performs power transition processing including startup, shutdown, or transit to the power saving state of the image forming apparatus 1 in response to a power control instruction from the switch 112. In the OFF state after the shutdown, when the switch is turned on, the startup of the image forming apparatus 1 begins. When the startup is completed, the image forming apparatus 1 comes into the normal power state, in which the image forming apparatus 1 is waiting for an instruction input from a user. In the restart of the image forming apparatus 1, the startup performed immediately after the shutdown is completed.

In the power saving state, components other than the CPU 101, the RAM 103, and the shaded hardware blocks shown in FIG. 1 are not energized. If the power control unit 115 receives an instruction from the shaded hardware blocks, the system transits to the normal power state.

Figure 2:
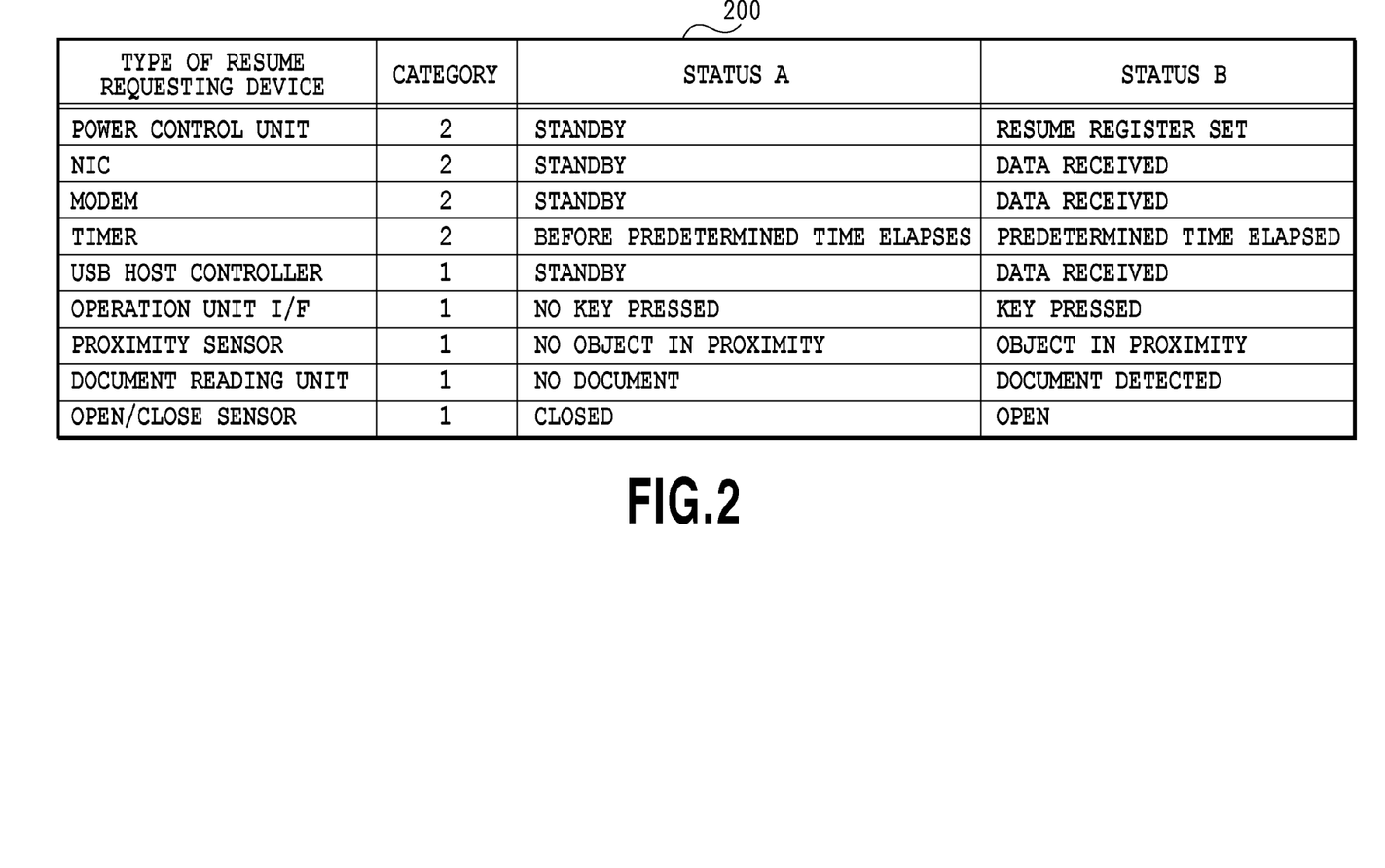
FIG. 2 is a category table according to the embodiment.

FIG. 2 shows a category table 200 according to the present embodiment. In the category table 200, types of resume requesting devices, categories to which the resume requesting devices belong, and statuses to which the resume requesting devices change are associated with each other and stored. To each type of resume requesting device, a category is set. In the present embodiment, categories include a first category (Category 1) having a high priority and a second category (Category 2) having a priority lower than that of the first category.

In the present embodiment, the category table 200 is referred to at the time of resume processing of the image forming apparatus 1, and a power transition mode is selected according to the category of the resume requesting device which has generated the resume request. Then, the power control unit 115 performs the resume processing of the image forming apparatus 1 in the selected power transition mode. It should be noted that if a plurality of resume requests are generated, a category having a high priority is applied.

More specifically, if the type of resume requesting device is only the NIC 104, a selection unit 307 which is a part of software features operating in the CPU 101 determines that a category is Category 2. On the other hand, if the types of resume requesting devices are the NIC 104 and the image reading unit 4 (the document reading unit 117 or the open/close sensor 118), the selection unit 307 determines that a category is Category 1 having a high priority.

These resume requesting devices generate an interrupt only in a case where they change from Status A (a first status), to Status B (a second status), and the interrupt is transmitted to the power control unit 115 as a resume request in the power saving state. For example, a resume request is generated if a document is placed on the document reading unit 117 in the power saving state, but a resume request is not generated if the document is removed. It should be noted that the CPU 101 can detect whether the device is in Status A or Status B with reference to the register in each resume requesting device.

Figure 3:
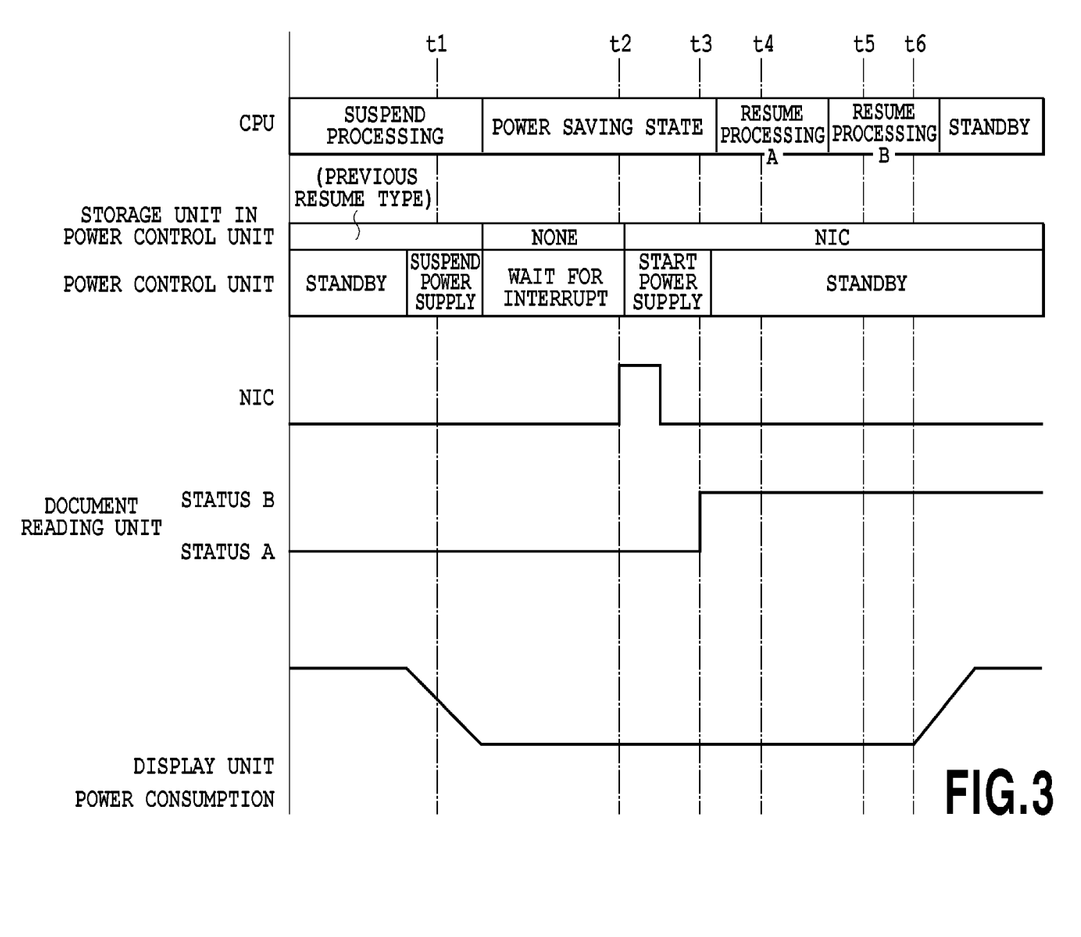
FIG. 3 is a timing diagram explaining time-line operations of the image forming apparatus in power state transition according to the embodiment.

FIG. 3 is a timing diagram showing power state transition between the power saving state and the normal power state of the image forming apparatus 1.

With reference to the timing diagram shown in FIG. 3, a description in time series will be given of the control by the CPU 101 and the power control unit 115 and the occurrence of a plurality of interrupt events.

By way of example, with reference to FIG. 3, a description will be given of the case where interrupt processing is successively performed by the NIC 104 and the document reading unit 117 as the resume requesting devices. Control by the power control unit 115 in the power saving state will be described later with reference to FIG. 6. Similarly, suspend processing, resume processing A, and resume processing B by the CPU 101 will be described later with reference to FIGS. 7 to 9.

The CPU 101 performs suspend processing to cause the power control unit 115 to suspend power supply. The CPU 101 acquires the status of the document reading unit 117 in t1, and stores in the RAM 103 status information indicating whether the document reading unit 117 is in Status A or Status B. Then, after the RAM 103 is self-refreshed, the CPU 101 itself transits to the power saving state. After suspending the power supply in response to the instruction from the CPU 101, the power control unit 115 comes to wait for an interrupt from the resume requesting device.

In t2, the NIC 104 receives a network packet transmitted from an external device via a network and notifies the power control unit 115 of a resume request. The power control unit 115 which has received the resume request resumes the power supply to the image forming apparatus 1, stores the resume request generated by the NIC 104 in the storage unit 116, restarts the CPU 101 at the time the power supply is completed, to perform resume processing A. It should be noted that hardware blocks to which power is supplied, triggered by the resume request in t2, are indicated by white hardware blocks shown in FIG. 1.

In t3, while the CPU 101 is performing the resume processing A, the document reading unit 117 detects a document and generates an interrupt. In t4, however, since the CPU 101 initializes the interrupt in the resume processing A, the interrupt from the document reading unit cannot be handled. This is because software operating on the CPU 101 can perform interrupt handler processing for handling the interrupt from each resume requesting device only after the interrupt initialization processing is completed.

In t5, the CPU 101 performs resume processing B. By acquiring resume factor information stored by the power control unit 115, the CPU 101 can determine that the resume is an event of the NIC 104.

In t6, an acquisition unit 301 reacquires a status of the document reading unit 117. As the status of the document reading unit 117 has changed from the status acquired in t1, it is determined that an event of the document reading unit 117 has also occurred. Accordingly, the CPU 101 can energize the display unit without missing the resume request in Category 1 (document reading unit 117) that has been generated in t3.

Figure 4:
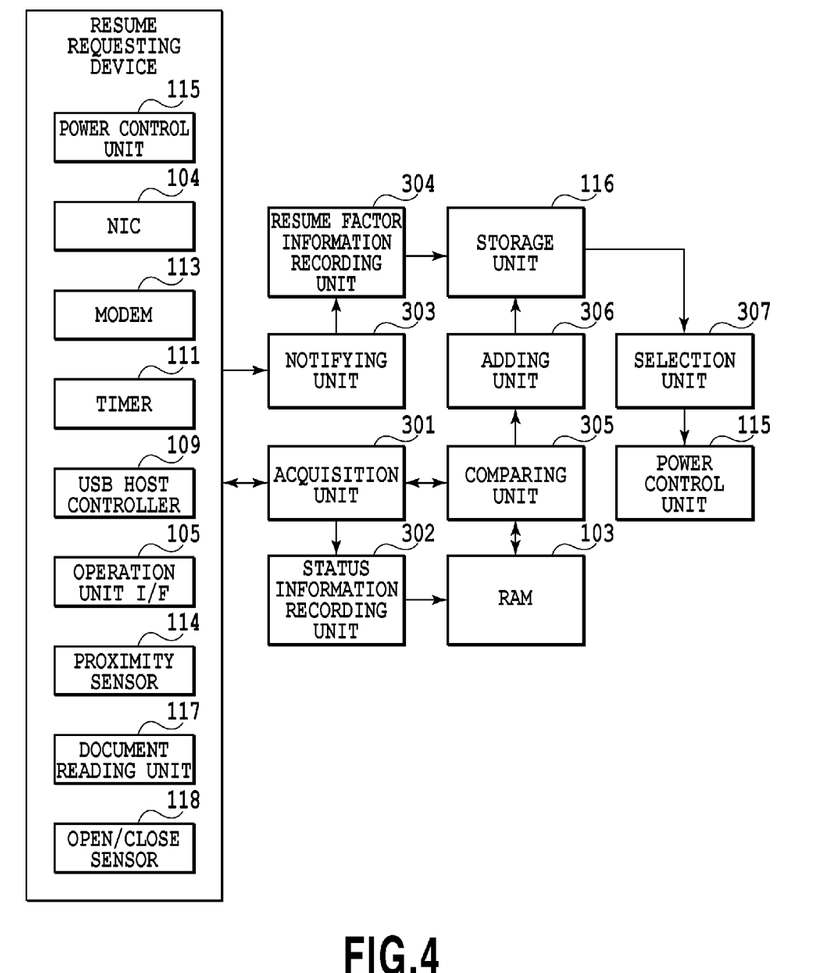
FIG. 4 is a block diagram showing function configurations of software in the image forming apparatus according to the embodiment.

FIG. 4 is a block diagram showing function configurations of software in the image forming apparatus 1 according to the present embodiment. The programs are loaded into the RAM 103. The loaded content of the processing is executed by the CPU 101, whereby the various functions which will be described below are achieved.

When performing suspend processing to switch the image forming apparatus 1 from the normal power state to the power saving state, the acquisition unit 301 acquires status information to determine whether each of the plurality of resume requesting devices is Status A or Status B (t1).

At this time, a status information recording unit 302 stores the acquired status information in the RAM 103 (t1).

While the image forming apparatus 1 is in the power saving state, a notifying unit 303 notifies the power control unit 115 of a resume request in response to the change in the status of the resume requesting device (t2).

At this time, a resume factor information recording unit 304 stores resume factor information indicating the type of resume requesting device which has notified the resume request in the storage unit 116 of the power control unit 115 (t2).

When performing resume processing to switch the image forming apparatus 1 from the power saving state to the normal power state, a comparing unit 305 compares the status information on each resume requesting device which has been reacquired by the acquisition unit 301 with the status information stored in the RAM 103 (t6).

In a comparison result obtained by the comparing unit 305, if there is a resume requesting device which has changed from Status A to Status B, an adding unit 306 adds the type of the resume requesting device to the resume factor information stored in the storage unit 116 of the power control unit 115 (t6).

The selection unit 307 refers to the category table, particularly to the resume factor information stored in the storage unit 116 of the power control unit 115. As a result of reference, if the resume factor information includes a resume requesting device associated with Category 1 having a high priority, a power transition mode placing emphasis on responsiveness to users, that is, a first power transition mode, is selected. If the first power transition mode selected, in power transition processing, the power control unit 115 energizes the operation unit 106 and a printing unit 5, which are devices of the image forming apparatus 1 needed for a response to a user operation.

Meanwhile, if the resume factor information includes only a resume requesting device associated with Category 2 having a low priority, a power transition mode placing emphasis on power saving, that is, a second power transition mode, is selected. If the second power transition mode is selected, in power transition processing, the power control unit 115 delays in energizing the operation unit 106 and the printing unit 5, which are devices of the image forming apparatus 1 needed for a response to a user operation.

Figure 5:
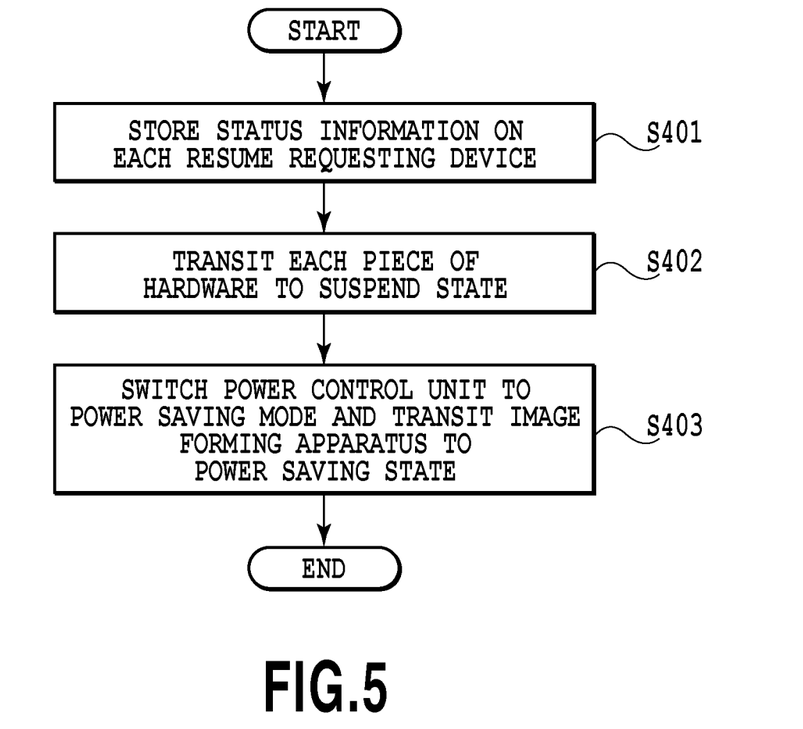
FIG. 5 is a flow chart showing exemplary suspend processing in the image forming apparatus according to the embodiment.

FIG. 5 is a flow chart showing exemplary suspend processing performed by the CPU 101 when the image forming apparatus 1 transits from the normal power state to the power saving state.

In S401, the CPU 101 acquires the status of each resume requesting device and stores the status information in the RAM 103. The status information stored in S401 is referred to in the resume processing B of the latter stage.

In S402, the CPU 101 transits each piece of hardware in the image forming apparatus 1 to a suspend state. More specifically, a current register setting is saved on the RAM 103, and register setting is made for the suspend state or a power cut state.

In S403, the CPU 101 switches the power control unit 115 to the power saving mode and places the RAM 103 into a self-refresh mode to perform suspend processing on the CPU 101 itself. Performing the processing in S403 by the CPU 101 allows the image forming apparatus 1 to enter the power saving state.

Figure 6:
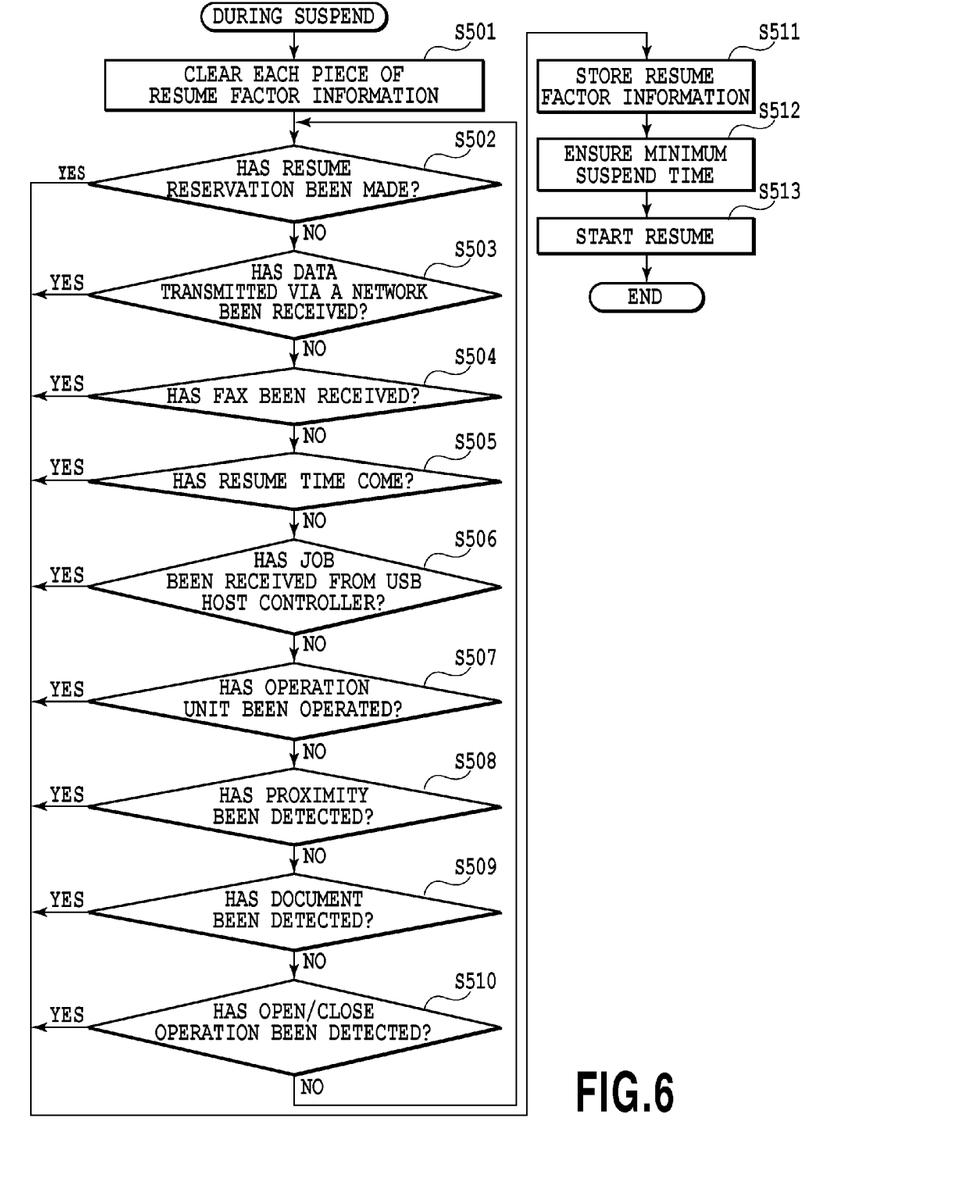
FIG. 6 is a flow chart showing an exemplary process in a power control unit during suspend according to the embodiment.

FIG. 6 is a flow chart showing an exemplary process in the power control unit 115 in the power saving state.

In FIG. 6, the power control unit 115 waits for a resume request interrupt and stores resume factor information in the storage unit 116 provided in the power control unit 115.

In S501, when the image forming apparatus 1 transits to the power saving state, the power control unit 115 clears the currently-stored resume factor information. Then, the power control unit 115 waits for a resume request interrupt from each resume requesting device.

In S502, it is determined whether a resume reservation for the power control unit 115 has been made. As used herein, the term "resume reservation" means processing in which the power control unit 115 receives a reservation for a resume factor during suspend processing (FIG. 3), for example, and stores in advance the reservation as a reserved register in the storage unit 116 of the power control unit 115. In S502, the power control unit 115 refers to whether the reserved register is stored in the storage unit 116 to determine whether a resume reservation for the power control unit 115 has been made. Examples of specific use cases include the case where a packet for causing the printing unit 5 to perform printing is received from the NIC 104 while the image forming apparatus 1 performs suspend processing. At this time, after the image forming apparatus 1 temporarily enters the power saving state, the power control unit 115 determines that the resume reservation has been made, and immediately performs resume processing.

In S503, the power control unit 115 determines whether data transmitted via a network has been received. At the same time, the power control unit 115 waits for an interrupt with respect to a packet reception interrupt from the NIC 104. When the interrupt from the NIC 104 is received, a determination in S503 is acknowledged.

In S504, the power control unit 115 determines whether a facsimile has received. At the same time, the power control unit 115 waits for a facsimile reception interrupt from the modem 113. When the interrupt from the modem 113 is received, a determination in S504 acknowledged.

In S505, the power control unit 115 determines whether a resume time has come. At the same time, the power control unit 115 waits for a specified time alarm interrupt from the timer 111. When the interrupt from the timer is received, a determination in S505 is acknowledged.

In S506, the power control unit 115 determines whether a job has been received from the USB host controller 109. At the same time, the power control unit 115 waits for a job reception interrupt from the USB host controller 109. When the interrupt from the USB host controller 109 is received, a determination in S506 is acknowledged.

In S507, the power control unit 115 determines whether the operation unit 106 has been operated. At the same time, the power control unit 115 waits for an interrupt from the operation unit I/F 105 by the operation of the operation unit 106. When the interrupt from the operation unit I/F 105 is received, a determination in S507 is acknowledged.

In S508, the power control unit 115 determines whether proximity to the proximity sensor 114 has been detected. At the same time, the power control unit 115 waits for a proximity detection interrupt from the proximity sensor 114. When the interrupt from the proximity sensor 114 is received, a determination in S508 is acknowledged.

In S509, the power control unit 115 determines whether a document has been placed on the document reading unit 117. At the same time, the power control unit 115 waits for an interrupt from the document detection sensor 119 of the document reading unit 117. When the interrupt from the document detection sensor 119 is received, a determination in S509 is acknowledged.

In S510, the power control unit 115 determines whether an open/close operation on the document reading unit 117 has been detected. At the same time, the power control unit 115 waits for an open/close interrupt from the open/close sensor 118. When the interrupt from the open/close sensor 118 is received, a determination in S510 is acknowledged. On the other hand, if the determination in S510 is rejected (S510: No), the process returns to S502, and the determination processing in S502 and the following steps is performed.

In S511, if a resume request interrupt is generated from any one of the resume requesting devices, the CPU 101 stores resume factor information indicating from which resume requesting device a resume request is received in the storage unit 116 provided in the power control unit 115.

In S512, to avoid a reset trouble of the CPU 101, the power control unit 115 performs control to ensure a minimum suspend time.

In S513, the power control unit 115 restarts the operation of the CPU 101 and causes the software to perform resume processing. The content of the resume processing in S513 and the following steps will be described later with reference to FIGS. 7 to 9.

Figure 7:
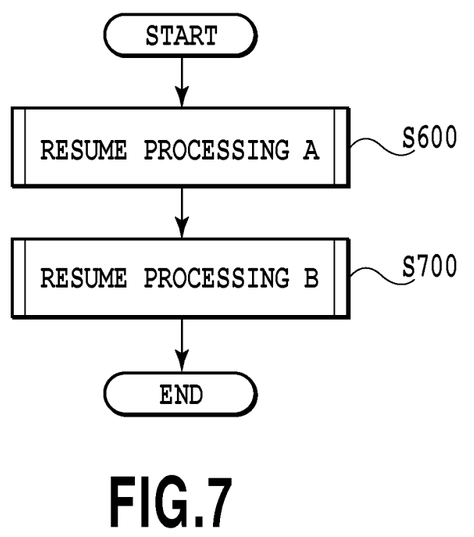
FIG. 7 is a flow chart showing exemplary resume processing in the image forming apparatus according to the embodiment.

FIG. 7 is a flow chart showing exemplary resume processing for transiting the image forming apparatus 1 from the power saving state to the normal power state.

The resume processing according to the present embodiment includes two steps: resume processing A (S600) which is a former step and resume processing B (S700) which is a latter step.

Details of the resume processing A (S600) and the resume processing B (S700) will be described with reference to FIG. 7 and FIG. 8, respectively. It should be noted that in the image forming apparatus 1 according to the present embodiment, the CPU 101 cannot perform hardware interrupt processing until the resume processing A is completed. Therefore, the CPU 101 cannot handle an interrupt from a resume requesting device which is notified by the power control unit 115.

Figure 8:
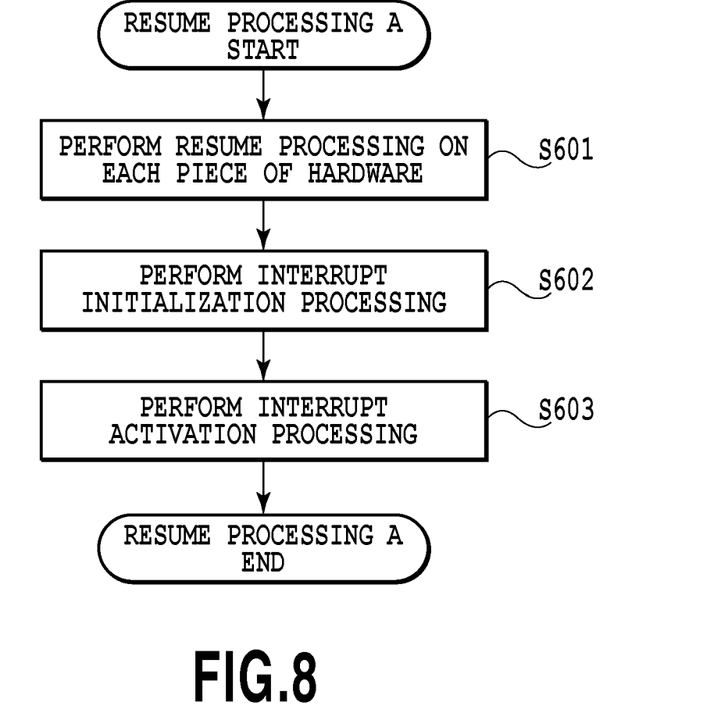
FIG. 8 is a flow chart showing an exemplary process in a former step of the resume processing according to the embodiment.

FIG. 8 is a flow chart showing an exemplary process in the former step (resume processing A) of the resume processing according to the present embodiment.

Through the processes of the flow chart shown in FIG. 8, the CPU 101 initializes hardware and sets interrupt processing. It should be noted that the processes of the flow chart shown in FIG. 8 are read to the RAM 103 and performed by the functions of the programs executed by the CPU 101.

In S601, the CPU 101 performs resume processing on each piece of hardware in the suspend state or the power cut state. At this time, for example, the CPU 101 performs setting of a register initial value for each piece of hardware.

In S602, the CPU 101 performs interrupt initialization processing. The reason for performing the processing in S602 is to eliminate chattering caused by occurrence of an unintended interrupt in an unstable power state during transition from the power saving state to the normal power state.

In S603, the CPU 101 performs interrupt activation processing. This allows the interrupt from the resume requesting device to be effectively accepted in S603 and the following steps, and accordingly, the CPU 101 can recognize a user operation which triggers a resume request.

Figure 9:
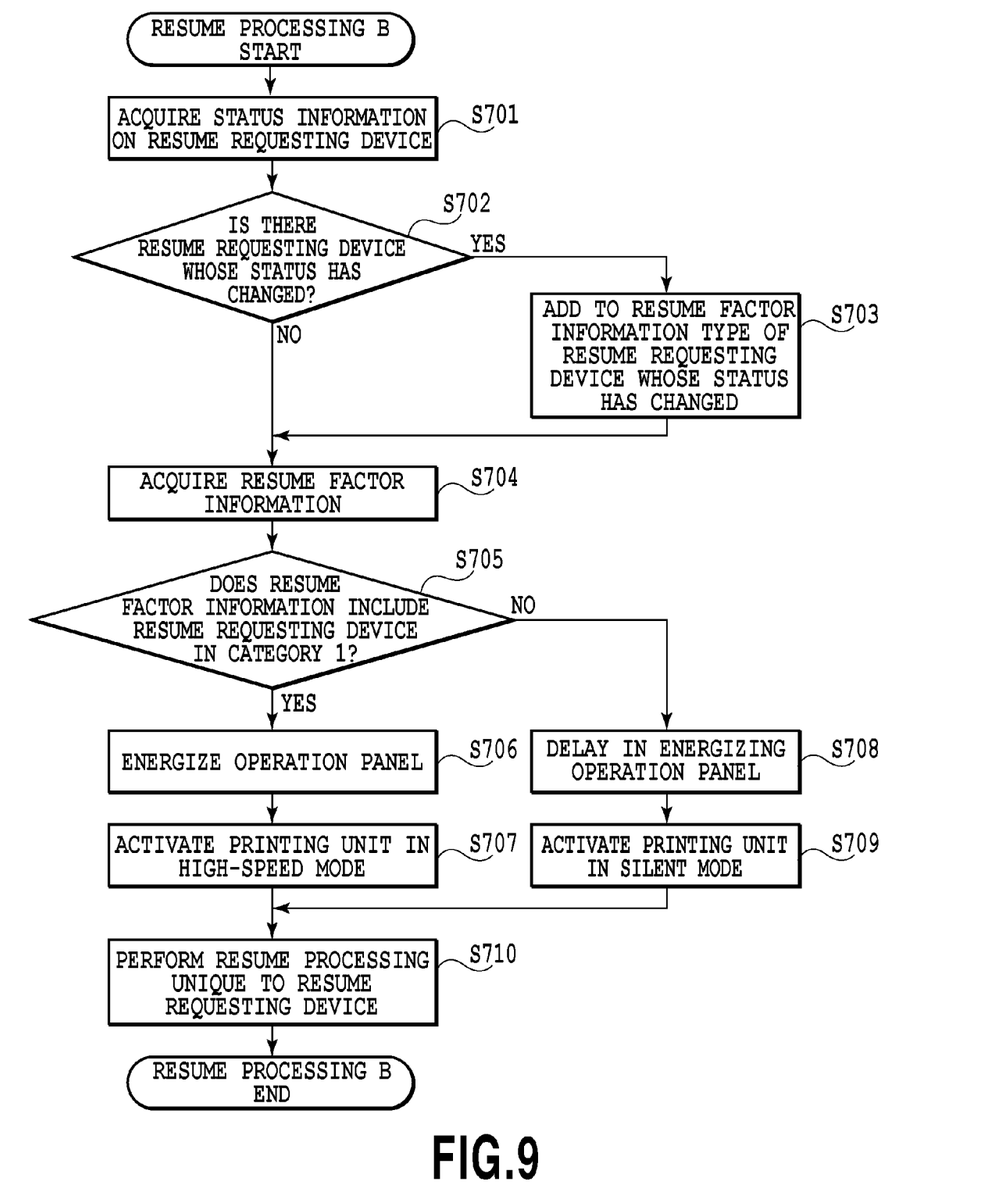
FIG. 9 is a flow chart showing an exemplary process in a latter step of the resume processing according to the embodiment.

FIG. 9 is a flow chart showing an exemplary process in the latter step (resume processing B) of the resume processing according to the present embodiment.

With reference to the flow chart of FIG. 9, the content of the resume processing according to the present embodiment will now be described. In the resume processing according to the present embodiment, a status change in a resume requesting device is detected based on the resume factor information stored in the storage unit 116 of the power control unit 115, and processing to select a power transition mode of the image forming apparatus 1 is performed. Furthermore, the power control unit 115 performs power transition processing to transit the image forming apparatus 1 from the power saving state to the normal power state according to the power transition mode.

In S701, the CPU 101 reacquires status information on each resume requesting device.

In S702, the CPU 101 compares status information on each resume requesting device stored when the image forming apparatus 1 is switched from the normal power state to the power saving state with status information on each resume requesting device reacquired by the acquisition unit 301. As a result of comparison, it is determined whether there is a resume requesting device which has changed from Status A to Status B. If a determination in S702 acknowledged (S702: Yes), the CPU 101 adds to the resume factor information the type of the resume requesting device whose status has changed (S703).

In S704, the CPU 101 acquires the resume factor information (S511) stored in the storage unit 116 of the power control unit 115.

As a specific example according to the present embodiment, a description will be given of the case where the document detection sensor 119 has not detected the placement of a document in S401 while the document detection sensor 119 has detected the placement of a document in S701. In this case, if the status information stored in S401 is different from the status of the document reading unit 117 acquired in S701 (S702: Yes), the CPU 101 determines that a resume request has also been generated by the device whose status has changed.

Next, in S705, with reference to the category table 200, the CPU 101 determines whether the resume factor information includes a resume requesting device associated with Category 1 having a high priority.

Here, in the present embodiment, resume requesting devices associated with Category 1 are the USB host controller 109, the operation unit I/F 105, the proximity sensor 114, the document reading unit 117, and the open/close sensor 118. All of these devices generate an interrupt for a resume request, caused by the presence of a user in proximity to the image forming apparatus 1 or a user operation.

Therefore, in a case where it is determined that the resume factor information includes a device in Category (S705: Yes), the CPU 101 determines that a user is in proximity to the image forming apparatus 1 and selects a first power transition mode for user convenience. If the first power transition mode is selected, the power control unit 115 performs resume processing placing emphasis on responsiveness to energize the devices of the image forming apparatus 1 needed for a response to a user operation.

If it is determined that the resume factor information includes a device in Category 1 (S705: Yes), the power control unit 115 restarts energization of the operation panel 3 in S706. Then, in S707, the power control unit 115 activates the printing unit 5 in a high-speed mode.

In a case where the printing unit 5 is activated in the high-speed mode, the power control unit 115 activates both a logic part and a mechanical driving part of the printing unit 5. Activating both the logic part and the mechanical driving part of the printing unit 5 can not only immediately receive an instruction input from the user to the operation panel 3 but also promptly accept a printing output request dependent on the operation of the mechanical driving part.

Meanwhile, in the present embodiment, the resume requesting devices associated with Category 2 having a priority lower than that of Category 1 are the NIC 104, the timer 111, the modem 113, and the power control unit 115. All of these resume requesting devices generate an interrupt for a resume request even if a user is absent in the vicinity of the image forming apparatus 1.

Therefore, if it is determined that the resume factor information includes only a device in Category 2 (S705: No), the CPU 101 determines that a user is absent in the vicinity of the image forming apparatus 1 and selects the second power transition mode for power saving for the image forming apparatus 1. If the second power transition mode is selected, the power control unit 115 performs resume processing placing emphasis on power saving to delay in energizing the devices of the image forming apparatus 1 needed for a response to a user operation.

If it is determined that the resume factor information does not include a resume requesting device in Category 1 (S705: No), the power control unit 115 performs resume processing placing emphasis on power saving.

In S708, the power control unit 115 delays in energizing the operation panel 3. Then, in S709, the power control unit 115 activates the printing unit 5 in a silent mode.

In a case where the printing unit 5 is activated in the silent mode, the power control unit 115 activates only the logic part of the printing unit 5. Activating only the logic part of the printing unit 5 and activating the mechanical driving part which consumes relatively a large amount of power only after receiving an instruction from the user can suppress power consumption of the image forming apparatus 1.

Then, in S710, the power control unit 115 performs resume processing unique to resume requesting devices. Examples of the resume unique to resume requesting devices include giving an operation sound at the same time as the resume by the operation panel 3.

As described above, the image forming apparatus 1 of the present embodiment compares the status information on a resume requesting device stored in the storage unit 116 provided in the power control unit 115 with the status information on the resume requesting device acquired by the acquisition unit 301 during suspend and resume. Comparing the statuses of the resume requesting device in this manner can perform resume processing on the image forming apparatus 1 without missing any resume request from the resume requesting devices.

Figure 10:
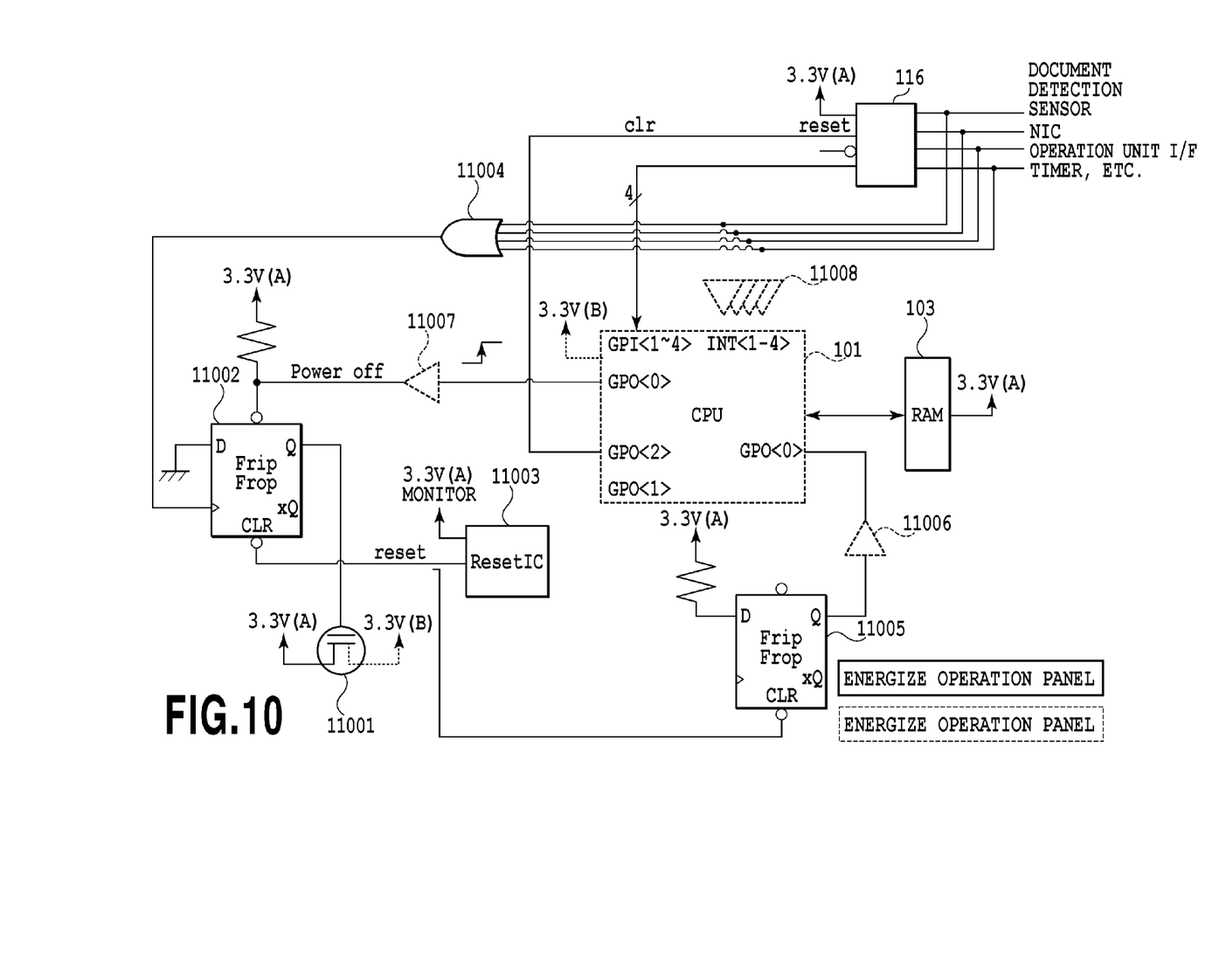
FIG. 10 shows an exemplary circuit configuration of the power control unit and peripheral equipment according to the embodiment.

FIG. 10 shows an exemplary circuit configuration of the power control unit 115 and peripheral equipment according to the present embodiment.

For simplicity, the circuit diagram shown in FIG. 10 illustrates the power control unit 115 and part of resume requesting devices. In an actual circuit, other resume requesting devices may be connected to the power control unit 115.

An FET 11001 has a function of isolating a sub power system and a main power system from each other based on a Q output applied to a gate of a flip flop 11002. Accordingly, if the sub power system and the main power system are isolated from each other and the image forming apparatus 1 transits to the power saving state, blocking of power supply to portions other than the main part of the image forming apparatus 1 can reduce unnecessary power consumption.

The storage unit 116 belongs to the sub power system and is capable of accepting first to fourth request instructions for cancelling the power saving mode even during the power saving mode. It should be noted that, in the present embodiment, the storage unit 116 receives the first to fourth request instructions respectively from the document detection sensor 119, the NIC 104, the operation unit I/F 105, and the timer 111. The first to fourth request instructions cause transition of the image forming apparatus 1 from the power saving state to the normal power state, and are inputted to the CPU 101 via buffers. Further, the first to fourth request instructions are inputted to a clock input end of the flip flop 11002 via an OR gate 11004, converted into, for example, 4-bit data, and stored in the storage unit 116. When the CPU 101 transits from the power saving state to the normal power state, the CPU 101 acquires the 4-bit data on condition that a flag set to a flip flop 11005 is "1".

The CPU 101 refers to a bit determination table associated in advance so as to determine the content of the first to fourth request instructions. The flip flop 11005 belongs to the sub power system and stores therein the content of the flag generated by the transition in a general purpose output port GPO<1> of the CPU 101 from an "L" state to an "H" state even after the image forming apparatus 1 transits from the power saving state to the normal power state. Further, in the flip flop 11005, a reset signal from a reset IC belonging to the sub power system is applied to a clear terminal (CLR), and a signal indicating this is outputted from the Q output to an input GPI<0> of the CPU 101 via a buffer.

The reset IC belongs to the sub power system and outputs a reset signal to the flip flop 11002 belonging to the sub power system. A buffer 11007 outputs a power off signal to the flip flop 11002. Buffers 11006, 11007, and 11008 belong to the main power system and serve to prevent current from flowing into the CPU 101 at the time of transition from the normal power state to the power saving state. Further, a reset IC 11003 monitors power systems during night and serves to clear the flag of the flip flop 11005 and latch data in the storage unit at the time of startup after shutdown. A logic OR gate serves to compile factors for resume from the power saving mode.

As described above, according to the present embodiment, there is provided an information processing apparatus capable of performing resume processing in response to the last-received resume request in a case where a resume request caused by another factor is generated after the resume processing is started and before the resume processing is completed. Accordingly, the information processing apparatus according to the present embodiment can perform resume processing without missing any resume request from the resume requesting devices.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

An information processing apparatus, a control method for an information processing apparatus, and a storage medium according to the present invention have been made in view of the above-described problems. More specifically, after a system receives a resume request and resume processing is started, if a resume request caused by another factor is generated before the resume processing is completed, the system is controlled to perform the resume processing in response to the last-received resume request.

While the present invention has been described with reference to exemplary embodiments, it is to be understood that the invention is not limited to the disclosed exemplary embodiments. The scope of t following claims is to be accorded the broadest interpretation so as to encompass all such modifications and equivalent structures and functions.

This application claims the benefit of Japanese Patent Application No. 2014-148831, filed Jul. 22, 2014, which is hereby incorporated by reference herein in its entirety.

What is claimed is:

1. An information processing apparatus capable of transiting to a first power state and to a second power state in which power consumption is lower than power consumption in the first power state, the apparatus comprising:
   a first wake-up device which outputs a wake-up request to wake-up the information processing apparatus from the second power state;
   a storage device which stores a status of the first wake-up device;
   a second wake-up device which outputs a wake-up request to wake-up the information processing apparatus from the second power state; and a power controller which shifts a state of the information processing apparatus from the second power state to the first power state based on the wake-up request from the second wake-up device;
  wherein the power controller acquires a status of the first wake-up device after receiving the wake-up request from the second wake-up device, and determines whether or not to light a display based on a result of comparison between the status of the first wake-up device stored in the storage device and the acquired status of the first wake-up device.

2. The information processing apparatus according to claim 1, wherein the power controller performs control to light the display if the status of the first wake-up device changes.

3. The information processing apparatus according to claim 1,
  wherein the first wake-up device is a document detection sensor for sensing a document placed on an image reading device for reading an image of the document, and
  wherein the power controller performs control to light the display if a state of the document detection sensor changes from a state of not detecting a document to a state of detecting a document.

4. The information processing apparatus according to claim 1, wherein when the information processing apparatus transits to the second power state, the status of the first wake-up device is stored in the storage device before the information processing apparatus transits to the second power state.

5. The information processing apparatus according to claim 1, wherein the result of comparison includes a type of the first wake-up device whose status has changed, the type being obtained by comparing the status of the first wake-up device stored in the storage device with the acquired status of the first wake-up device, and
  wherein the power controller determines whether or not to light the display based on the type of the first wake-up device.

6. The information processing apparatus according to claim 5, wherein if the type of the first wake-up device is a type that makes a wake-up request to cause the information processing apparatus to wake-up from the second power state in response to a user operation, the power controller performs control to light the display.

7. The information processing apparatus according to claim 6, wherein the display accepts an instruction input from a user.

8. The information processing apparatus according to claim 5, wherein if the type of the first wake-up device is a type that makes a wake-up request to cause the information processing apparatus to wake-up from the second power state in response to reception of data transmitted via a network, the power controller performs control to delay the lighting of the display.

9. The information processing apparatus according to claim 8, wherein the display accepts an instruction input from a user.

10. A control method for an information processing apparatus capable of transiting to a first power state and to a second power state in which power consumption is lower than power consumption in the first power state, the control method comprising the steps of:
  outputting a wake-up request from a first wake-up device to wake-up the information processing apparatus from the second power state;
  storing a status of the first wake-up device;
  outputting a wake-up request from a second wake-up device to wake-up the information processing apparatus from the second power state;
  shifting a state of the information processing apparatus from the second power state to the first power state based on the wake-up request from the second wake-up device;
  acquiring a status of the first wake-up device after receiving the wake-up request from the second wake-up device; and
  determining whether or not to light a display based on a result of comparison between the status of the first wake-up device stored in the storing step and the acquired status of the first wake-up device acquired in the acquiring step.

11. The control method according to claim 10, further comprising the step of:
  controlling to light the display if the status of the first wake-up device changes.

12. The control method according to claim 10,
  wherein the first wake-up device is a document detection sensor for sensing a document placed on an image reading device for reading an image of the document, and further comprising the step of:
  controlling to light the display if the document detection sensor changes from a state of not detecting a document to a state of detecting a document.

13. The control method according to claim 10, wherein when the information processing apparatus transits to the second power state, the status of the first wake-up device is stored in the storing step before the information processing apparatus transits to the second power state.

14. The control method according to claim 10,
  wherein the result of comparison includes a type of the first wake-up device whose status has changed, the type being obtained by comparing the status of the first wake-up device stored in the storing step with the acquired status of the first wake-up device acquired in the acquiring step, and
  wherein in the determining step, whether or not to light the display is determined based on the type of the first wake-up device.

15. The control method according to claim 14, wherein if the type of the first wake-up device is a type that makes a wake-up request to cause the information processing apparatus to wake-up from the second power state in response to a user operation, it is determined to perform control to light the display in the determining step.

16. The control method according to claim 15, wherein the display accepts an instruction input from a user.

17. The control method according to claim 14, wherein if the type of the first wake-up device is a type that makes a wake-up request to cause the information processing apparatus to wake-up from the second power state in response to reception of data transmitted via a network, it is determined to perform control to delay lighting the display in the determining step.

18. The control method according to claim 17, wherein the display accepts an instruction input from a user.

19. A printing apparatus capable of transiting to a power saving state, the printing apparatus comprising:
  a device;
  a display;
  a sensor;
  a network interface; and a power controller which shifts a state of the printing apparatus from the power saving state, in which power supply to the device and the display is stopped, to a first power state, in which power is supplied to the device and the display, based on a sensing result of the sensor, and shifts the state of the printing apparatus from the power saving state to a second power state, in which power is supplied to the device but power supply to the display is stopped, based on the network interface receiving specific data from an external device;

wherein, when the network interface receives the specific data from the external device, the power controller shifts the state of the printing apparatus from the power saving state to the second power state and determines whether or not to supply power to the display based on a result of comparison between the status of the sensor before the network interface receives the specific data and the status of the sensor after the network interface receives the specific data.

20. The printing apparatus according to claim 19, wherein the power controller performs control to supply power to the display if the result of comparison indicates that the status of the sensor has changed.

* * * * *